US006718937B2

(12) United States Patent
Kim

(10) Patent No.: US 6,718,937 B2
(45) Date of Patent: Apr. 13, 2004

(54) SYSTEM AND METHOD FOR PERFORMING PARTIAL CYLINDER CUT-OFF OF INTERNAL COMBUSTION ENGINE

(75) Inventor: Jin-Gi Kim, Jeonju (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 10/115,837

(22) Filed: Apr. 2, 2002

(65) Prior Publication Data

US 2002/0189574 A1 Dec. 19, 2002

(30) Foreign Application Priority Data

Jun. 14, 2001 (KR) ........................................ 2001-33622

(51) Int. Cl.[7] ................................................ F02B 77/00
(52) U.S. Cl. .................................................. 123/198 F
(58) Field of Search ............................ 123/198 F, 481, 123/1.98 DB, 90.16, 90.15, 90.17

(56) References Cited

U.S. PATENT DOCUMENTS 4,305,355 A * 12/1981 Jordan .................... 123/198 F
4,494,502 A * 1/1985 Endo et al. .............. 123/198 F
5,617,829 A * 4/1997 Bidner et al. ............... 123/481
6,412,461 B2 * 7/2002 Nakashima .............. 123/90.16
6,585,621 B2 * 7/2003 Matthews et al. .......... 477/115

FOREIGN PATENT DOCUMENTS

| | | |
|---|---|---|
| JP | 62-314464 | 12/1987 |
| JP | 01-324461 | 12/1989 |
| JP | 03-344746 | 12/1991 |
| KR | 93-19996 | 3/1993 |

* cited by examiner

*Primary Examiner*—Tony M. Argenbright
*Assistant Examiner*—Hyder Ali
(74) *Attorney, Agent, or Firm*—Morgan Lewis & Bockius LLP

(57) ABSTRACT

A system and method for performing partial cylinder cut-off of an internal combustion engine is provided, the system including a rocker arm including first and second arms that are selectively joined together; a rocker arm connecting unit operated by hydraulic pressure and which performs the operation of selectively joining the first and second arms of the rocker arm; a separation-preventing unit interposed between the rocker arm and the rocker arm connecting unit, the separation-preventing unit preventing the separation of the rocker arm from the rocker arm connecting unit; and a hydraulic pressure supply unit controlled by an electronic control unit to supply and exhaust hydraulic pressure to and from the rocker arm connecting unit, the electronic control unit performing control of the hydraulic pressure supply unit according to comparisons made between received signals of vehicle state and pre-installed data.

16 Claims, 5 Drawing Sheets

SYSTEM AND METHOD FOR PERFORMING PARTIAL CYLINDER CUT-OFF OF INTERNAL COMBUSTION ENGINE

FIELD OF THE INVENTION

The present invention relates to a system and method for performing partial cylinder cut-off of an internal combustion engine, and more particularly, to a system and method for performing partial cylinder cut-off of an internal combustion engine in which the operation of a predetermined number of cylinders is discontinued in a low load state such that fuel consumption and exhaust gases are reduced.

BACKGROUND OF THE INVENTION

An internal combustion engine that is used as a power source for vehicles operates by supplying an air-fuel mixture to a combustion chamber, igniting the mixture, and using the resulting combustive force to drive a piston. In particular, the piston undergoes rectilinear motion by the applied force, and this rectilinear motion is converted into rotational motion by a crankshaft assembly.

Exhaust gases generated by the combustion of fuel are expelled from the engine into the air. The harmful substances in the exhaust gases, that is, hydrocarbons(HC), carbon monoxide (CO), and nitrogen oxides (NOx), are a major cause of air pollution. As a result, most countries have emission standards in place that must be met by automobile manufacturers. In an effort to satisfy increasingly stringent emission laws and regulations, there is continuing research to reduce the harmful exhaust gases by automobile manufacturers.

A relatively new method of reducing emissions is that of discontinuing the operation of a predetermined number of cylinders in a low load state (i.e., during idle and low speeds) such that a rotational force sufficient only to prevent the engine from stalling is provided. In addition to reducing exhaust gases, the cutting off of one or more cylinders during a low load state improves fuel efficiency. Examples of this new technique are disclosed in Korean Patent No. 2000-020351 and Korean Patent No. 1998-062253.

In Korean Patent No. 2000-020351, fuel supplied to two cylinders in a four-cylinder engine is cut off in a low load state such that the amount of exhaust gases is reduced by fifty percent. In Korean Patent No. 1998-062253, engine rpm are detected and compared with a predetermined rpm stored in an electronic control unit. If it is determined that the engine is in an idle state, the injection of fuel is discontinued for specific cylinders.

However, in the case of Korean Patent No. 2000-020351, since the valves continue to operate normally even with the discontinuation of the supply of fuel, intake air is exhausted through the exhaust system. This causes an increase in the time required to reach a catalytic activation temperature when the vehicle is first started, which acts to increase emissions. Also, because of the cooling effect of the intake air on the cylinder block, the catalytic cleansing efficiency is reduced by the mixture of ignited and un-ignited fuel. Therefore, it becomes necessary to completely re-design the exhaust system. However, the resulting structure capable of overcoming these problems is complicated and heavy.

In the case of Korean Patent No. 1998-062253, since control is performed by merely detecting engine rpm, no flexibility is provided for special conditions such as consideration for differing loads. Also, un-ignited fuel is directly exhausted through the exhaust system.

SUMMARY OF THE INVENTION

The present invention provides a system and method for performing partial cylinder cut-off of an internal combustion engine, in which the operation of a predetermined number of cylinders is discontinued in a low load state (during idling, at low speeds, etc.) such that fuel consumption and exhaust gases are reduced.

In a preferred embodiment of the invention, a system comprises a rocker arm including first and second arms that are selectively joined together; a rocker arm connecting unit for performing an operation of selectively joining the first and second arms of the rocker arm; a separation-preventing unit interposed between the rocker arm and the rocker arm connecting unit, the separation-preventing unit preventing separation of the rocker arm from the rocker arm connecting unit; and a hydraulic pressure supply unit controlled by an electronic control unit to supply and exhaust hydraulic pressure to and from the rocker arm connecting unit, the electronic control unit performing control of the hydraulic pressure supply unit according to comparisons made between received signals of vehicle state and pre-installed data.

The rocker arm connecting unit preferably comprises a support bracket including a chamber formed within the support bracket and a passageway through which hydraulic pressure is supplied to and exhausted from the chamber, the chamber including a first section and a second section, the second section having a smaller diameter than the first section; a linking shaft including a first land formed on an innermost end of the linking shaft and slidably provided in the first section of the chamber, a second land formed at a predetermined distance from the first land and slidably provided in the second section of the chamber, and an outer sleeve formed on an end of the linking shaft opposite the first land, the outer sleeve operating to selectively connect the first and second arms of the rocker arm; and a first elastic member interposed between an innermost wall of the chamber and the first land of the linking shaft.

The rocker arm may be separated into the first and second arms at substantially a center portion thereof, in which each of the arms includes a substantially circular indented portion, the first and second arms being assembled with the indented portions abutting one another, the indented portions of the first and second arms being formed to enable the first and second arms to be freely rotated within a predetermined rotational angle, the indented portions of the first and second arms include sleeve holes formed at a predetermined diameter in a center of the indented portions, and the indented portions include teeth formed protruding toward the center of the indented portions, wherein teeth are formed on an outer circumference of the outer sleeve, the teeth of the outer sleeve being selectively meshed with the teeth of the indented portions of the arms.

The first elastic member preferably is a compression spring that provides a constant biasing force to the linking shaft in a direction of the rocker arm.

The separation-preventing unit in a preferred embodiment may comprise a slide rod provided within the outer sleeve of the linking shaft; a cap coupled to an outermost end of the outer sleeve, the slide rod being slidably inserted into the cap, the cap acting as a guide for the sliding motion of the slide rod and for preventing the slide rod from exiting the outer sleeve; a second elastic member interposed between the cap and a head of the slide rod, the head being formed at an innermost end of the slide rod; and a two-stage rod including a large diameter section and a small diameter section, the two-stage rod being attached to the slide rod in a state such that the small diameter section is inserted into the sleeve hole of the second arm and the large diameter section is flush with an outer surface of the second arm, thereby preventing separation of the rocker arm from the rocker arm connecting unit.

A plurality of protrusions are preferably formed on an outer circumference of the head of the slide rod, and grooves corresponding to the protrusions are formed in an inner diameter portion of the outer sleeve such that the protrusions are able to slide within the grooves.

The hydraulic pressure supply unit preferably comprises a hydraulic pump for generating hydraulic pressure, the hydraulic pump being mounted on a line in communication with the rocker arm connecting unit; an ON/OFF solenoid valve controlled by the electronic control unit and mounted on the line downstream from the hydraulic pump, the ON/OFF solenoid valve allowing the supply or cutting off of the supply of hydraulic pressure from the hydraulic pump to the rocker arm connecting unit; a check valve mounted on the line downstream from the hydraulic pump; a reservoir mounted on the line between the check valve and the rocker arm connecting unit; and an exhaust solenoid valve provided between the check valve and the reservoir.

A method according to a preferred embodiment of the invention for performing partial cylinder cut-off of an internal combustion engine comprises determining if cut-off conditions are satisfied; and discontinuing opening and closing of intake and exhaust valves for a predetermined number of cylinders if the cut-off conditions are satisfied.

According to a further alternative embodiment, the method of the invention comprises determining if a time that a transmission is in neutral exceeds a first predetermined time; determining if a vehicle speed is 0 if the time that the transmission is in neutral exceeds the first predetermined time; discontinuing the operation of intake and exhaust valves for a first predetermined number of cylinders if the vehicle speed is 0; determining if an accelerator pedal is controlled to on in a state where the operation of the intake and exhaust valves for the first predetermined number of cylinders is discontinued, reactivating the operation of the intake and exhaust valves for the first predetermined number of cylinders if the accelerator pedal is controlled to on, and returning to discontinuing the operation of the intake and exhaust valves for the first predetermined number of cylinders if the accelerator pedal is not controlled to on; determining if the accelerator pedal is controlled to on if the time that the transmission is in neutral does not exceed the first predetermined time; determining if a time that the accelerator pedal is in an off state exceeds a second predetermined time and if a change in vehicle speed is less than 0, in the case where the accelerator pedal is not controlled to on; discontinuing operation of intake and exhaust valves for a second predetermined number of cylinders if the time that the accelerator pedal is in an off state exceeds the second predetermined time and if the change in vehicle speed is less than 0; determining if the accelerator pedal is controlled to on in a state where the operation of the intake and exhaust valve for the second predetermined number of cylinders is discontinued, and reactivating the operation of the intake and exhaust valves for the second predetermined number of cylinders if the accelerator pedal is controlled to on; and determining that the vehicle speed is 0 if the accelerator pedal is not controlled to on, returning to discontinuing the operation of the intake and exhaust valves for the first predetermined number of cylinders if the vehicle speed is 0, and returning to discontinuing the operation of the intake and exhaust valves for the second predetermined number of cylinders if the vehicle speed is not 0.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
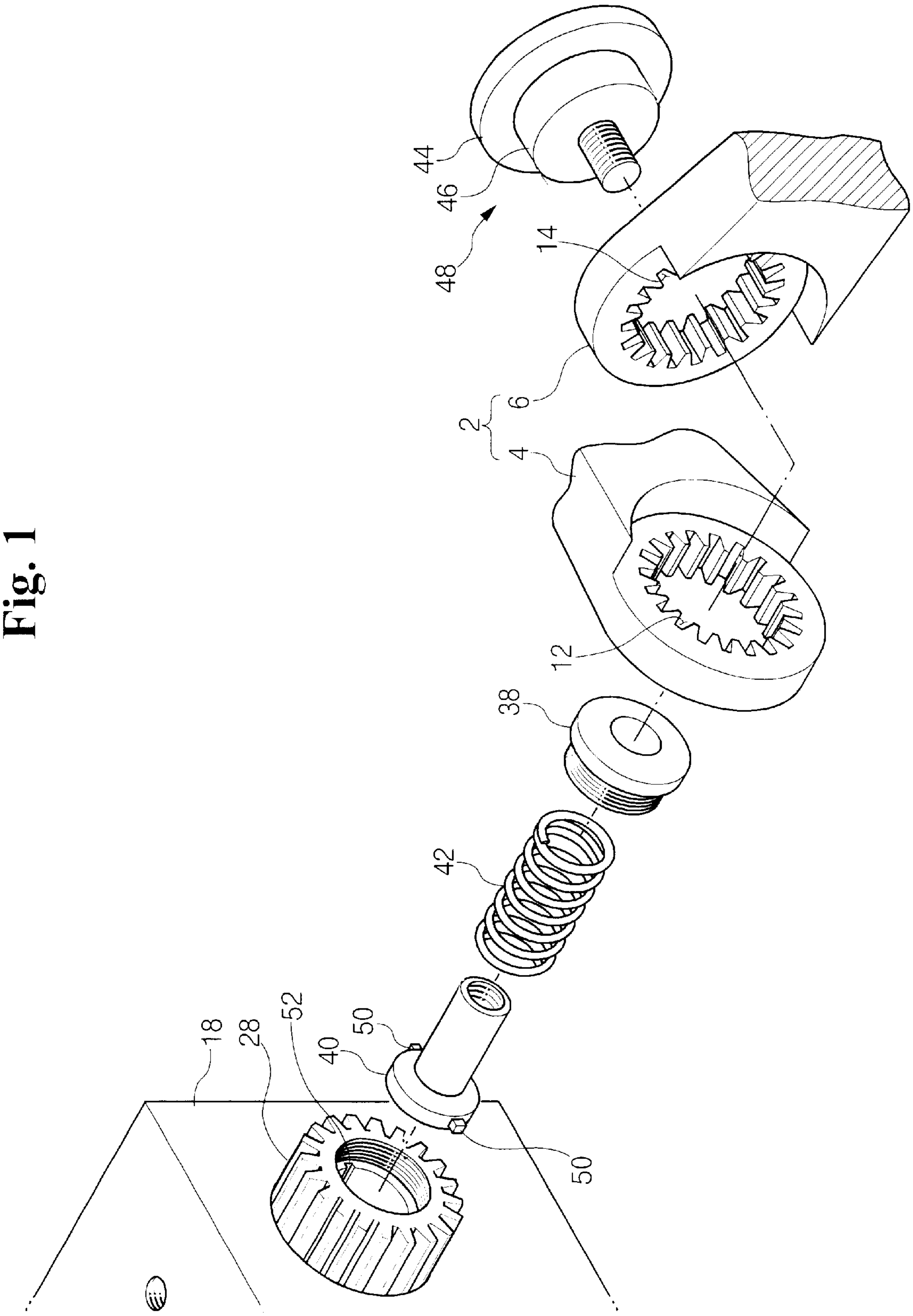
FIG. 1 is a perspective view of main elements involved in a system for performing partial cylinder cut-off of an internal combustion engine according to a preferred embodiment of the present invention.

Referring to FIG. 1, a rocker arm 2 is made up of first and second arms 4 and 6. The first arm 4 contacts intake and exhaust valve stem ends (not shown) to raise and lower intake and exhaust valves, and the second arm 6 contacts a profile surface of a camshaft lobe (not shown) to operate by following the profile surface.

Figure 2:
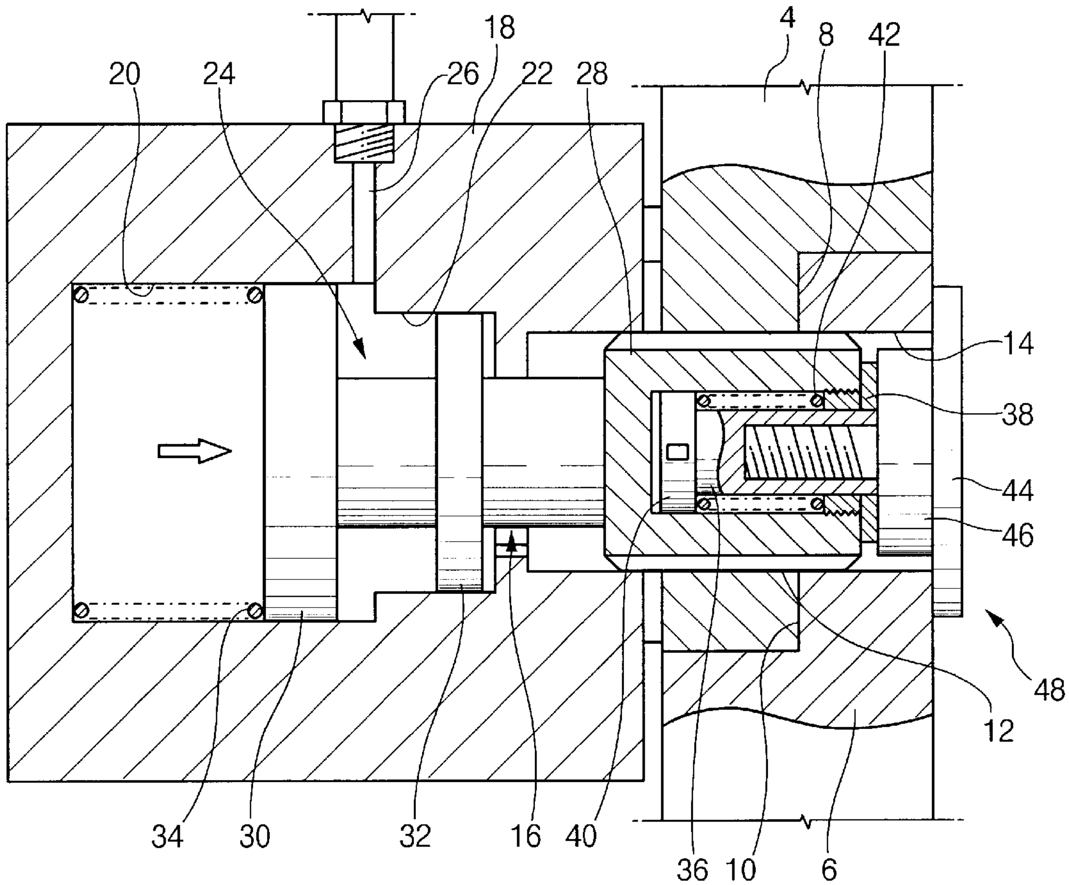
FIG. 2 is a sectional view of the elements of FIG. 1 in an assembled state.

The first and second arms 4 and 6 include indented, half-thickness portions 8 and 10, respectively, and are assembled with the indented portions 8 and 10 abutting one another (See FIG. 2). The indented portions 8 and 10 are substantially circular. With this configuration, the rocker arm 2 appears as a single element when the system is assembled as shown in FIG. 2. The indented portions 8 and 10 of the first and second arms 4 and 6 are formed to enable the first and second arms 4 and 6 to be freely rotated within a predetermined rotational angle.

Further, sleeve holes 12 and 14 having a predetermined diameter are formed through the centers of indented portions 8 and 10, respectively. The first and second arms 4 and 6 are joined and separated by the insertion of an outer sleeve 28 into the sleeve holes 12 and 14. Sleeve 28 is carried on linking shaft 16 as shown in FIG. 2. Gear teeth are formed in the sleeve holes 12 and 14 of the first and second arms 4 and 6, and corresponding gear teeth are formed on an outer surface of the outer sleeve 28 of linking shaft 16. If linking shaft 16 is filly inserted into the sleeve holes 12 and 14, the gear teeth of the outer sleeve 28 are meshed with the gear teeth of both the sleeve holes 12 and 14 such that the first and second arms 4 and 6 are joined together to form the rocker arm 2. The joining and separation of the first and second arms 4 and 6 will be described in more detail below.

As shown in FIG. 2, linking shaft 16 is provided partially within a chamber 24, which is substantially cylindrical and formed in a support bracket 18. The linking shaft 16 is controlled by hydraulic pressure to move back and forth in chamber 24 of the support bracket 18. The chamber 24 includes a first section 20 and a second section 22, the first section 20 having a larger diameter than the second section 22. A passageway 26 through which hydraulic pressure is supplied to and exhausted from the chamber 24 is formed extending from an outer surface of the support bracket 18 to the first section 20 of the chamber 24. The passageway 26 exits into the first section 20 at an area adjacent to the second section 22.

A first land 30 is formed on an end of the linking shaft 16 positioned in the chamber 24, and a second land 32 is formed on the linking shaft 16 at a predetermined distance from the first land 30. The first land 30 has a diameter slightly smaller than that of the first section 20 of the chamber 24 and moves back and forth therein. The second land 32 has a diameter slightly smaller than that of the second section 22 of the chamber 24 and also moves back and forth therein. Therefore, the first land 30 has a larger diameter than the second land 32. Also, a first elastic member 34 is interposed between the first land 30 and an innermost wall of the first section 20 of the chamber 24. The first elastic member 34 provides a constant biasing force in the rightward direction (in FIG. 2) to the linking shaft 16.

A means to prevent the disconnection of the rocker arm 2 is provided within and attached to the outer sleeve 28 of the linking shaft 16. Slide rod 36, which is substantially cylindrical, is provided within the outer sleeve 28. A circular head 40 is integrally formed at an innermost end of the slide rod 36, the head 40 having a larger diameter than the remainder of the slide rod 36. A cap 38 is screwed into threads formed on an inner circumference of the outer sleeve 28, the cap 38 acting as a guide for the sliding motion of the slide rod 36 in the left and right directions (in FIG. 2), and, at the same time, preventing the slide rod 36 from exiting the outer sleeve 28. Also, a second elastic member 42 is interposed between the cap 38 and the head 40 of the slide rod 36.

A two-stage rod 48 is provided against the second arm 6 and is attached to the slide rod 36. That is, the two-stage rod 48 includes a threaded bolt portion, a large diameter section 44, and a small diameter section 46. The threaded bolt portion is screwed into threads formed within the slide rod 36 such that the small diameter section 46 is inserted into the sleeve hole 14 of the second arm 6 and the large diameter section 44 is flush with an outer surface of the second arm 6. Accordingly, when assembled, the large diameter section 44 of the two-stage rod 48 is in close contact with an outer surface of the second arm 6, and by the elastic force of the second elastic member 42, the first and second arms 4 and 6 of the rocker arm 2 are maintained in close contact.

Further, a plurality of protrusions 50 are formed on an outer circumference of the head 40 of the slide rod 36, and grooves 52 corresponding to the protrusions 50 are formed in an inner diameter portion of the outer sleeve 28 such that the protrusions 50 are able to slide within the grooves 52. As a result, the slide rod 36 is able to undergo only relative translational back and forth and not rotational movement. Such rotational movement of the slide rod 36 is prevented both during the screwing of the cap 38 onto the slide rod 36 and during translation of the slide rod 36.

In a state where no hydraulic pressure is supplied to the chamber 24 as in the case of FIG. 2, the linking shaft 16 is displaced to the right (in the drawing) by the biasing force of the first elastic member 34 such that the outer sleeve 28 is inserted into both of the sleeve holes 12 and 14 of the first and second arms 4 and 6 to join the first and second arms 4 and 6 as a single unit.

Figure 3:
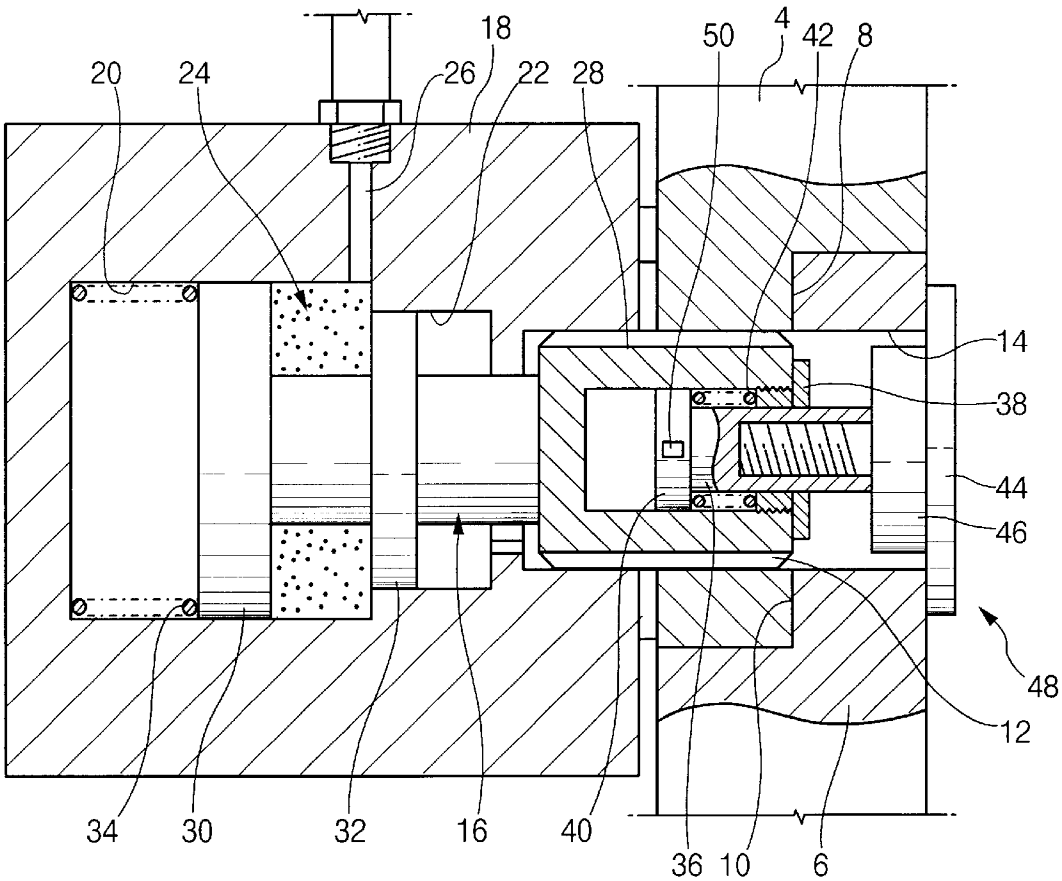
FIG. 3 is a sectional view of the elements of FIG. 1 in an assembled state and in a state where an operation of a rocker arm is discontinued.

If hydraulic pressure is supplied to the chamber 24, the linking shaft 16 receives a leftwardly biasing force (in FIG. 2) because of the difference in area between the first and second lands 30 and 32. If the force provided by hydraulic pressure surpasses the force provided by the first elastic member 34, the linking shaft 16 is displaced to the left as shown in FIG. 3 such that the outer sleeve 28 is separated from the sleeve hole 14 of the second arm 6. As a result, if the first arm 4 is operated by the rotation of the camshaft (not shown), the rotational force is not transmitted to the second arm 6, thereby discontinuing the opening and closing of the corresponding valve.

Figure 4:
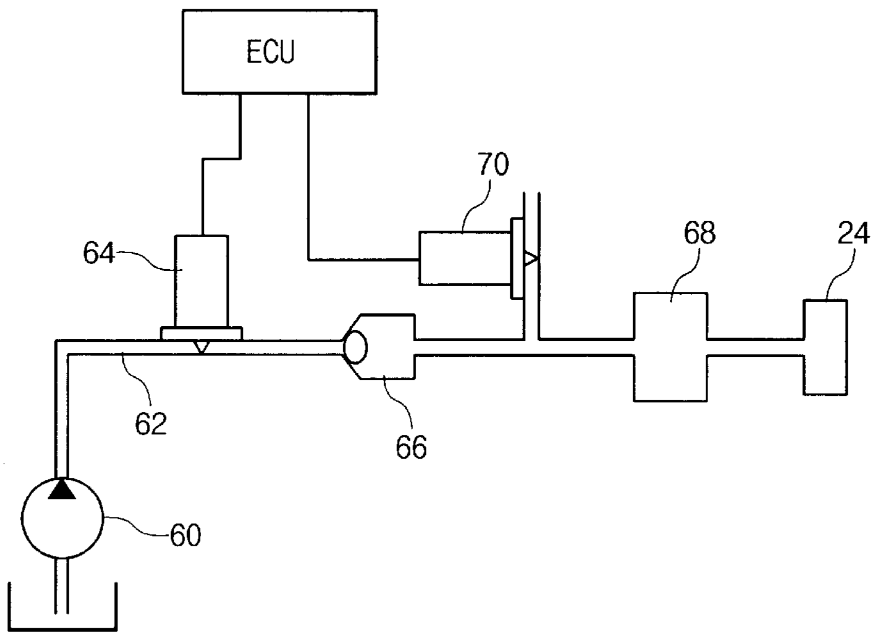
FIG. 4 is a schematic diagram of a hydraulic system for operating a system for performing partial cylinder cut-off of an internal combustion engine according to a preferred embodiment of the present invention.

As described above, hydraulic pressure is used as the driving force to operate the present invention. A schematic diagram of a hydraulic system for operating the present invention is shown in FIG. 4. A hydraulic pump 60, which creates hydraulic flow to generate hydraulic pressure, is communicated with the chamber 24 via a line 62. An ON/OFF solenoid valve 64, a check valve 66, and a reservoir 68 are provided on the line 62 between the hydraulic pump 60 and the chamber 24. Also, an exhaust solenoid valve 70 is provided between the check valve 66 and the reservoir 68.

The ON/OFF solenoid valve 64 and the exhaust solenoid valve 70 are controlled by an electronic control unit (ECU) 90. The check valve 66 allows the flow of hydraulic pressure in the line 62 to be in only the direction toward the chamber 24, and it prevents hydraulic flow in the opposite direction. The reservoir 68 is used to increase the speed of hydraulic flow to the chamber 24.

If the time that the vehicle is stopped exceeds a predetermined period of time, the ECU 90 controls the ON/OFF solenoid valve 64 such that hydraulic pressure generated by the hydraulic pump 60 is supplied to the chamber 24. As a result, the linking shaft 16 is moved to the left (i.e., from a state as shown in FIG. 2 to a state as shown in FIG. 3) such that the outer sleeve 28 is separated from the second arm 6, thereby discontinuing the opening and closing operation of the corresponding valve by the second arm 6.

If the hydraulic pressure in the chamber 24 is then exhausted by the ECU 90 controlling the operation of the exhaust solenoid valve 70, the linking shaft 16 is moved to the right (i.e., from a state as shown in FIG. 3 to a state as shown in FIG. 2). That is, by exhausting the hydraulic pressure in the chamber 24, the elastic force of the first elastic member 34 acts on the linking shaft 16 to displace the same to the right (in FIG. 2). Therefore, the teeth of the outer sleeve 28 are meshed with the teeth of both the first and second arms 4 and 6 to lock these elements together.

The above system may be applied to as many cylinders as desired.

Figure 5:
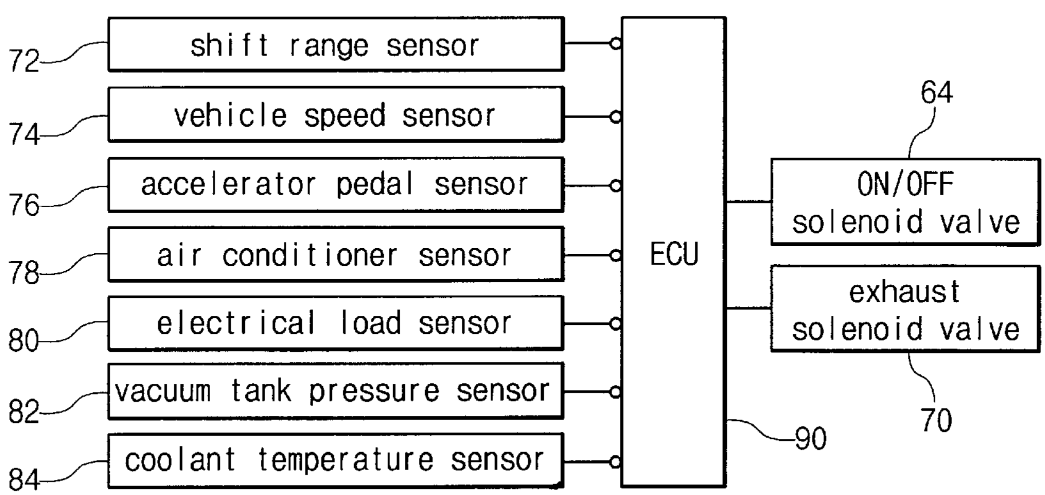
FIG. 5 a block diagram of an electrical system for operating a method for performing partial cylinder cut-off of an internal combustion engine according to a preferred embodiment of the present invention.

To control the hydraulic system described above, the ECU 90 receives signals from a plurality of sensors as shown in FIG. 5. In more detail, the ECU 90 receives signals from a shift range sensor 72, a vehicle speed sensor 74, an accelerator pedal sensor 76, an air conditioner sensor 78, an electrical load sensor 80, a vacuum tank pressure sensor 82, and a coolant temperature sensor 84. The ECU 90 compares the received signals with pre-installed data to determine whether to operate the ON/OFF solenoid valve 64 and the exhaust solenoid valve 70.

Figure 6:
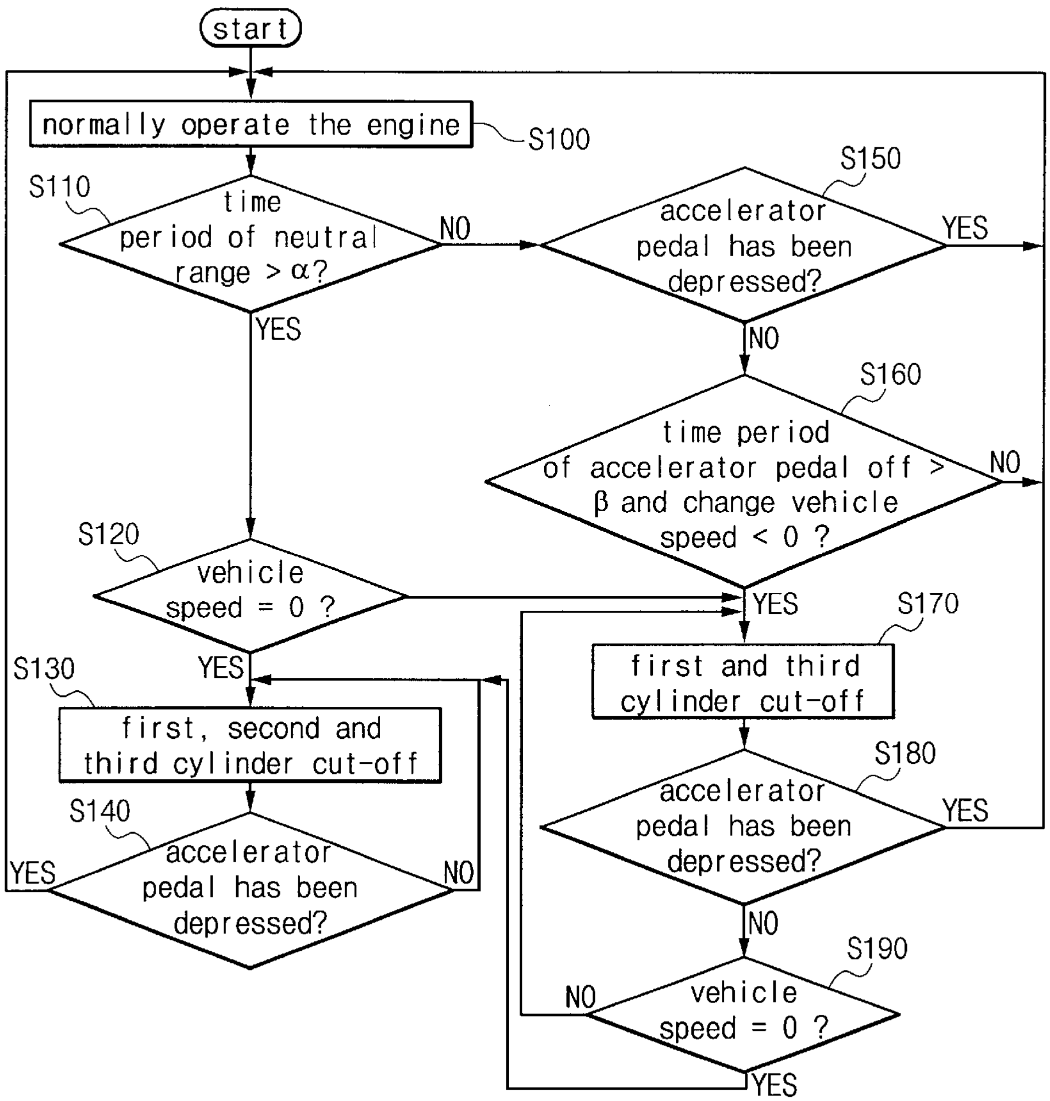
FIG. 6 a flow chart of method for performing partial cylinder cut-off of an internal combustion engine according to a preferred embodiment of the present invention.

FIG. 6 is a flow chart of method for performing partial cylinder cut-off of an internal combustion engine according to a preferred embodiment of the present invention.

In a state where the engine is operating in a normal state (a state where the vehicle is not stopped) in step S100, the ECU 90 determines if a neutral range is maintained for a time greater than a first predetermined time (α) in step S110. If the time that the vehicle is in neutral exceeds the first predetermined time (α), it is determined if a present vehicle speed is 0 in step S120. If the present vehicle speed is 0, a single designated cylinder is left activated and the hydraulic pressure in the chambers 24 for the remaining cylinder valve opening/closing units is exhausted in step S130. In this state where the operation of a predetermined number of cylinders is discontinued, the ECU 90 determines if the accelerator pedal has been depressed by the driver in step S140. If this condition is satisfied, the cylinders that have been deactivated are again operated.

In step S110, if the time that the vehicle is in the neutral range is less than or equal to the first predetermined time (α), it is determined if the driver has depressed the accelerator pedal (i.e., if the accelerator pedal is in an on state) in step S150. If the driver has depressed the accelerator pedal, the process is returned to step S100 of the engine operating in a normal state. However, if it is determined that the driver has not depressed the accelerator pedal in step S150, it is determined if a time that the accelerator pedal is maintained in an off state is greater than a second predetermined time (β) and also if a change in vehicle speed is less than 0 in step S160. If these conditions are satisfied, operation of a predetermined number of cylinders, within the number of cylinders provided with cylinder valve opening/closing units, is discontinued in step S170. Discontinuation of the operation of a predetermined number of cylinders within the number of cylinders that are provided with cylinder valve opening/closing units is performed such that crankshaft balance is maintained. Step 170 of discontinuing the operation of a predetermined number of cylinders is also performed if in step S120 it is determined that the present vehicle speed is not 0.

In a state where a predetermined number of cylinders are not operated, the ECU 90 determines if the driver has depressed the accelerator pedal in step S180. If the accelerator pedal is not controlled to an On state, it is then determined if the present vehicle speed is 0 in step S190. However, if it is determined that the accelerator pedal is controlled to an On state in step S180, the process is returned to step S100 of the engine operating in a normal state. On the other hand, if the present vehicle speed is 0 in step S190, step S130 in performed, in which a single designated cylinder is activated while the hydraulic pressure in the chambers 24 for the remaining cylinder valve opening/closing units is exhausted. However, if the vehicle speed is not 0 in step S190, the process is returned to step S170 of discontinuing the operation of a predetermined number of cylinders.

In summarizing the operation of the present invention, if the vehicle speed is at 0 while in a neutral state, it is determined that the vehicle is in an idle state and all the cylinders except one are deactivated. On the other hand, if it is determined that the vehicle is in a low load state, a smaller number of cylinders is deactivated than that in the idle state. The number of cylinders deactivated in either situation may be varied depending on particular needs and on the total number of cylinders, which was assumed to be four in the above explanation.

In the preferred embodiment of the present invention, the conditions used for control are vehicle speed and transmission range time (i.e., the time that the vehicle is in neutral). However, other conditions may be used including air conditioner operation, electrical load (heater, head lamp operation), vacuum tank pressure, and coolant temperature.

Further, at points where the opening and closing operations of the valves are started and ended, throttle opening and ignition timing may be controlled to minimize noise and vibrations caused by torque variations, and to prevent overcooling in the cylinders resulting from the closing of all valves in the case where cylinder functioning is lost by the link release of the rocker arm. In addition, the operation of returning the linking shaft after release of the same from the second arm is performed when the profile surface of the camshaft lobe is not applying force to the second arm 6.

In the present invention structured and operating as in the above, a predetermined number of cylinders is deactivated in a low load state such as during idle and at low speeds such that fuel consumption is reduced and exhaust gases are reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system for performing partial cylinder cut-off of an internal combustion engine, comprising:

a rocker arm including first and second arms selectively operable jointly or independently;

a rocker arm connecting unit selectively joining said first and second arms for joint operation;

a separation-preventing unit interposed between the rocker arm and the rocker arm connecting unit, the separation-preventing unit preventing separation of the rocker arm from the rocker arm connecting unit; and a hydraulic pressure supply to supply and exhaust hydraulic pressure to and from the rocker arm connecting unit wherein supplied pressure activates said connecting unit for said joint operation.

2. The system of claim 1, further comprising an the electronic control unit performing control of the hydraulic pressure supply unit according to comparisons made between received signals of vehicle state and pre-installed data.

3. The system of claim 1 wherein the rocker arm connecting unit comprises:

a support bracket including a chamber formed within the support bracket and a passageway through which hydraulic pressure is supplied to and exhausted from the chamber, the chamber including a first section and a second section, the second section having a smaller diameter than the first section;

a linking shaft including a first land formed on an innermost end of the linking shaft and slidably provided in the first section of the chamber, a second land formed at a predetermined distance from the first land and slidably provided in the second section of the chamber, and an outer sleeve formed on an end of the linking shaft opposite the first land, the outer sleeve operating to selectively connect the first and second arms of the rocker arm; and a first elastic member interposed between an innermost wall of the chamber and the first land of the linking shaft.

4. A system according to claim 3 wherein the rocker arm is separated into the first and second arms at substantially a center portion thereof, in which each of the arms includes a substantially circular indented portion, the first and second arms being assembled with the indented portions abutting one another, the indented portions of the first and second arms being formed to enable the first and second arms to be freely rotated within a predetermined rotational angle, the indented portions of the first and second arms include sleeve holes formed at a predetermined diameter in a center of the indented portions, and the indented portions including teeth formed protruding toward the center of the indented portions, wherein teeth are formed on an outer circumference of the outer sleeve, the teeth of the outer sleeve being selectively meshed with the teeth of the indented portions of the arms.

5. The system of claim 3 wherein the first elastic member is a compression spring that provides a constant biasing force to the linking shaft in a direction of the rocker arm.

6. The system of claim 4 wherein the separation-preventing unit comprises:

a slide rod provided within the outer sleeve of the linking shaft;

a cap coupled to an outermost end of the outer sleeve, the slide rod being slidably inserted into the cap, and the cap acting as a guide for the sliding motion of the slide rod and for preventing the slide rod from exiting the outer sleeve;

a second elastic member interposed between the cap and a head of the slide rod, the head being formed at an innermost end of the slide rod; and a two-stage rod including a large diameter section and a small diameter section, the two-stage rod being attached to the slide rod in a state such that the small diameter section is inserted into the sleeve hole of the second arm and the large diameter section is flush with an outer surface of the second arm, thereby preventing separation of the rocker arm from the rocker arm connecting unit.

7. The system of claim 6 wherein a plurality of protrusions are formed on an outer circumference of the head of the slide rod, and grooves corresponding to the protrusions are formed in an inner diameter portion of the outer sleeve such that the protrusions are able to slide within the grooves.

8. The system of claim 2 wherein the hydraulic pressure supply unit comprises:

a hydraulic pump for generating hydraulic pressure, the hydraulic pump being mounted on a line in communication with the rocker arm connecting unit;

an ON/OFF solenoid valve controlled by the electronic control unit and mounted on the line downstream from the hydraulic pump, the ON/OFF solenoid valve allowing the supply or cutting off of the supply of hydraulic pressure from the hydraulic pump to the rocker arm connecting unit;

a check valve mounted on the line downstream from the hydraulic pump;

a reservoir mounted on the line between the check valve and the rocker arm connecting unit; and an exhaust solenoid valve provided between the check valve and the reservoir.

9. A method for performing partial cylinder cut-off of an internal combustion engine comprising:

determining if cut-off conditions are satisfied;

discontinuing opening and closing of intake and exhaust valves for a predetermined number of cylinders if the cut-off conditions are satisfied;

wherein the cut-off conditions include cases where an engine idle state is satisfied and a low load state of the engine is satisfied; and wherein it is determined that the vehicle is in an engine idle state if a time that a transmission is in neutral exceeds a first predetermined time, and if a vehicle speed is 0.

10. The method of claim 9 wherein it is determined that the vehicle is in a low load state if a time that a transmission is in neutral is less than or equal to a first predetermined time, if a time that an accelerator pedal is in an off state is less than or equal to a second predetermined time, and if a change in vehicle speed is less than 0.

11. The method of claim 9 wherein in the case the cut-off conditions are satisfied through the determination that the vehicle is in the engine idle state, operation of intake and exhaust valves for a first predetermined number of cylinders is discontinued;

wherein in the case the cut-off conditions are satisfied through the determination that the vehicle is in the low load state, operation of intake and exhaust valves for a second predetermined number of cylinders is discontinued; and wherein the first predetermined number of cylinders is greater than the second predetermined number of cylinders.

12. The method of claim 11 further comprising discontinuing the operation of the intake and exhaust valves for the second predetermined number of cylinders if a time that the vehicle is in neutral exceeds a first predetermined time and if a vehicle speed is not 0.

13. The method of claim 11 further comprising:

determining if conditions for reactivating the cut-off cylinders are satisfied; and reactivating the intake and exhaust valves that have been discontinued if the conditions for reactivating the cut-off cylinders are satisfied.

14. The method of claim 13 wherein the conditions for reactivating the cut-off cylinders include a condition in which an accelerator pedal is depressed in the state where the operation of intake and exhaust valves for a predetermined number of cylinders is discontinued.

15. The method of claim 14 wherein if the conditions for reactivating the cut-off cylinders are not satisfied during the discontinuation of the operation of the intake and exhaust valves for the second predetermined number of cylinders, which is effected by satisfying the cut-off conditions through the determination that the vehicle is in the low load state, the method further comprises:

determining if a vehicle speed is 0; and discontinuing the operation of intake and exhaust valves for an additional cylinder(s) such that the operation of the intake and exhaust valves for the first predetermined number of cylinders is discontinued.

16. A method for performing partial cylinder cut-off of an internal combustion engine comprising:

determining if a time that a transmission is in neutral exceeds a first predetermined time;

determining if a vehicle speed is 0 if the time that the transmission is in neutral exceeds the first predetermined time;

discontinuing the operation of intake and exhaust valves for a first predetermined number of cylinders if the vehicle speed is 0;

determining if an accelerator pedal is controlled to on in a state where the operation of the intake and exhaust valves for the first predetermined number of cylinders is discontinued, reactivating the operation of the intake and exhaust valves for the first predetermined number of cylinders if the accelerator pedal is controlled to on, and returning to discontinuing the operation of the intake and exhaust valves for the first predetermined number of cylinders if the accelerator pedal is not controlled to on;

determining if the accelerator pedal is controlled to on if the time that the transmission is in neutral does not exceed the first predetermined time;

determining if a time that the accelerator pedal is in an off state exceeds a second predetermined time and if a change in vehicle speed is less than 0, in the case where the accelerator pedal is not controlled to on;

discontinuing operation of intake and exhaust valves for a second predetermined number of cylinders if the time that the accelerator pedal is in an off state exceeds the second predetermined time and if the change in vehicle speed is less than 0;

determining if the accelerator pedal is controlled to on in a state where the operation of the intake and exhaust valve for the second predetermined number of cylinders is discontinued, and reactivating the operation of the intake and exhaust valves for the second predetermined number of cylinders if the accelerator pedal is controlled to on; and determining that the vehicle speed is 0 if the accelerator pedal is not controlled to on, returning to discontinuing the operation of the intake and exhaust valves for the first predetermined number of cylinders if the vehicle speed is 0, and returning to discontinuing the operation of the intake and exhaust valves for the second predetermined number of cylinders if the vehicle speed is not 0.

* * * * *